M. PIER.
APPARATUS FOR EFFECTING REACTIONS OF HYDROGEN UNDER PRESSURE.
APPLICATION FILED MAY 7, 1914.

1,159,865.

Patented Nov. 9, 1915.

WITNESSES
Frank Hogan
Cornelius Hoving

INVENTOR
MATHIAS PIER
BY H. van Dedunnel
ATTORNEY

UNITED STATES PATENT OFFICE.

MATHIAS PIER, OF ZEHLENDORF, NEAR BERLIN, GERMANY.

APPARATUS FOR EFFECTING REACTIONS OF HYDROGEN UNDER PRESSURE.

1,159,865.  Specification of Letters Patent.  Patented Nov. 9, 1915.

Application filed May 7, 1914. Serial No. 836,950.

*To all whom it may concern:*

Be it known that I, MATHIAS PIER, subject of German Emperor, residing at Zehlendorf, near Berlin, Germany, have invented new and useful Improvements in Apparatus for Effecting Reactions of Hydrogen Under Pressure; and I do hereby declare the following to be a full, clear, and exact description of the same.

Figure 1:
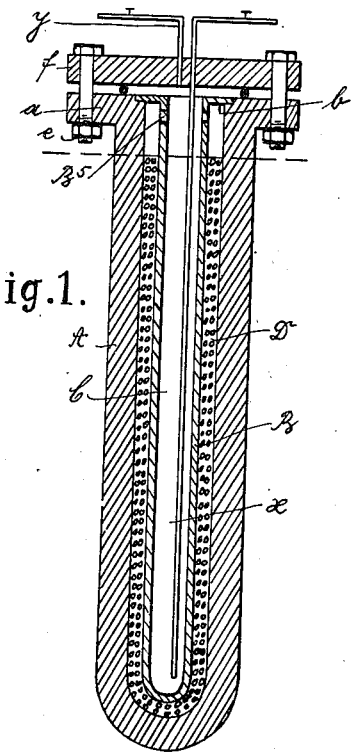
Figure 2:
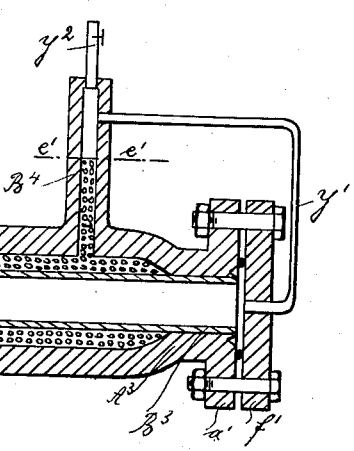

Referring to the accompanying drawings, Figure 1 illustrates, in section one form of apparatus for carrying out my new method; and Fig. 2 is a like view of another form of the apparatus.

In order to protect the highly-heated metal of the reaction apparatus from the deleterious action of the hydrogen or hydrogen-containing gas, it is necessary, as pointed out in my United States Patent 1090874, dated March 24, 1914, to prevent, as far as possible, the hydrogen coming into contact with said metal. Experience has shown that such metal parts are, when highly heated, subject to chemical action by and leakage therethrough of hydrogen.

The patent mentioned describes one means of assuring the desired result, including inner reaction vessel composed of material proof after long-continued use against chemical action by and against leakage therethrough of hydrogen, and, during the reaction, the exterior of such vessel is subjected to pressure exerted by a harmless gas, as nitrogen.

In the use of my present invention, the indifferent gas is not availed of, and a material maintained between the inner and outer vessels is itself proof against chemical action by and leakage therethrough of hydrogen. As a consequence, it is a matter of indifference whether the inner vessel has the characteristics before mentioned. The inner reaction vessel may consist of metal or of any other material, it being sufficient that it shall maintain its shape when highly heated and will not permit leakage thereinto of the surrounding material.

The material between the two vessels may be any that is suitable. For instance, it may, as my experience has shown to be very useful, be an alloy of metals having a low fusing point (lower than that of either the inner or the outer vessel), the mixture being one which maintains the form of a bath during the heating treatment necessary to bring about reaction and which is proof against chemical action by and leakage therethrough of hydrogen. The alloy may be that known as Wood's metal, or any other suitable.

In the practice of my new process, the bath protects the outer vessel (usually of iron or steel) from contact of the hydrogen.

The new process can be carried out in the following manner, referring to Fig. 1:— Fused metal D is poured in desired quantity into the outer vessel A, which may be of steel or iron. An inner vessel B (of metal, porcelain, or other material) is then fitted within the outer vessel, and dips into the fused metal, raising the level of the latter to (say) the point $e$. A flange, $b$, formed upon the inner vessel (or other means) sustains the two vessels out of contact so as to leave a space entirely around and below the inner vessel. A cover $f$ is then fitted to the apparatus, by means of bolts which pass therethrough and through a flange, $a$, formed on the outer vessel. The hydrogen or hydrogen gas-containing mixture will be supplied and drawn off by means of pipes $x$ and $y$. Above the level ($e$) of the bath, the inner vessel has one or more openings $B^5$, constituting a means for connecting the two vessels, to balance pressures therein.

In practice, it has been found that the upper part of the outer vessel does not reach a temperature sufficiently high to permit the hydrogen to injuriously affect the metal; contact at such point may, therefore, be disregarded.

After the lid or cap $f$ has been bolted on, the vessel is placed under pressure and is heated, from the outside, up to the desired temperature. After an experiment, lasting for a number of days, using an apparatus like that of Fig. 1, and with a nitrogen-hydrogen mixture of 150 atmospheres and a hydrogen content of 90%, treated at a temperature of 550° C., no alteration of the percentage of hydrogen was noticeable.

Another form of apparatus, also devised by me, for carrying out the new process is shown in Fig. 2, in which both inner and outer vessels (B' and A') are in the form of tubular bodies each open at both ends, the two vessels being connected at their outer ends (at $A^2 B^2$ and at $A^3 B^3$), and the outer vessel being spaced away between those ends to provide a long annular chamber D'. As before, the inner vessel may be of any desired material, while the outer one will usually be of steel or of iron. The material in the chamber D' may be any suitable, providing it is substantially proof against chemical action by and leakage therethrough of hydrogen.

In use, both ends of the apparatus of Fig. 2 may be closed by caps $f'$, $f'$, clamped to place by bolts passing through the caps and through flanges $a'$, $a'$. The casing or outer vessel A' may have a hollow extension $B^4$ extending upwardly therefrom, and the metal or other mass may be at the level $e'$—$e'$ therein. A pipe Y' may connect the interior chamber C' with the hollow extension $B^4$, at a point above the level $e'$—$e'$—this being substantially the equivalent of the openings $B^5$ of Fig. 1. The hydrogen is supplied and drawn off from the apparatus of Fig. 2, by means of the pipes $x'$, $y'$ and $y^2$. Heat is supplied to the apparatus at about $A^5$, while the temperature at the contacting parts $A^2 B^2$ and $A^3 B^3$ will usually be such that any contact of hydrogen, thereat, with the steel or iron of the outer vessel will not injure the latter.

What I claim is:

1. In an apparatus for effecting reaction of hydrogen and the like under pressure, an inner vessel, an outer vessel spaced apart from that first-mentioned, and a mass of material which is proof against chemical action by and against leakage therethrough of hydrogen, said mass being within said space and closely embracing the inner vessel.

2. In an apparatus for effecting reaction of hydrogen and the like under pressure, an inner vessel, an outer vessel spaced apart from that first mentioned, and a mass of material having a low point of fusion and proof against leakage therethrough of hydrogen and placed within the space between the vessels.

3. In an apparatus for effecting reaction of hydrogen and the like under pressure, an inner vessel, an outer vessel spaced apart from that first mentioned, and a mass of metal which is proof against chemical action by and leakage therethrough of hydrogen and which is within the space aforesaid and surrounds the inner vessel.

4. In an apparatus for effecting reaction of hydrogen and the like under pressure, a tubular inner vessel open at both ends, an outer tubular surrounding vessel also open at both ends, a space between the vessels, material proof against leakage therethrough of hydrogen in the space between said vessels, and means for supplying hydrogen to the inner vessel.

5. In an apparatus for effecting reaction of hydrogen and the like under pressure, a tubular inner vessel open at both ends, an outer tube surrounding vessel also open at both ends, the two vessels being in contact at each of their ends, material proof against leakage therethrough of hydrogen in the space between said vessels, and spaced apart between said ends, and means for closing said apparatus at both ends.

6. In an apparatus for effecting reaction of hydrogen and the like under pressure, an inner vessel, an outer vessel surrounding and spaced from that first-mentioned, a bath within said space and which is proof against chemical action by and leakage therethrough of hydrogen, and means connecting the two vessels the upper part of said means being disposed above the level of the bath, said connecting means being so displaced as to allow the equalization of pressure in the two vessels without at the same time allowing the flow of bath material from the one vessel to the other.

In testimony whereof, I have signed my name to this specification in the presence of two subscribing witnesses.

MATHIAS PIER.

Witnesses:
HENRY HASPER,
WOLDEMAR HAUPT.